United States Patent
Yang Mao (10) Patent No.: US 11,270,101 B2
(45) Date of Patent: Mar. 8, 2022

(54) IMAGINARY FACE GENERATION METHOD AND SYSTEM, AND FACE RECOGNITION METHOD AND SYSTEM USING THE SAME

(71) Applicant: INDUSTRIAL TECHNOLOGY RESEARCH INSTITUTE, Hsinchu (TW)

(72) Inventor: Shih-Fang Yang Mao, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 14 days.

(21) Appl. No.: 16/816,821

(22) Filed: Mar. 12, 2020

(65) Prior Publication Data

US 2021/0133430 A1 May 6, 2021

(30) Foreign Application Priority Data

Nov. 1, 2019 (TW) .................................. 108139713

(51) Int. Cl.
*G06K 9/00* (2006.01)
*G06T 5/50* (2006.01)
*G06T 7/90* (2017.01)

(52) U.S. Cl.
CPC ..... *G06K 9/00281* (2013.01); *G06K 9/00255* (2013.01); *G06T 5/50* (2013.01);
(Continued)

(58) Field of Classification Search
CPC ........... G06K 9/00281; G06K 9/00268; G06K 9/00275; G06K 9/00288; G06K 9/00221; G06K 9/00228; G06K 9/00234; G06K 9/00241; G06K 9/00255; G06T 5/50; G06T 7/90; G06T 7/73; G06T 2207/20221;
(Continued)

(56) References Cited

U.S. PATENT DOCUMENTS 7,095,879 B2 8/2006 Yan et al.
7,127,087 B2 10/2006 Huang et al.
(Continued)

FOREIGN PATENT DOCUMENTS

CN 107392213 A 11/2017
CN 107767335 A * 3/2018
(Continued)

OTHER PUBLICATIONS

Valentine T, Lewis MB, Hills PJ. "Face-space: A unifying concept in face recognition research." Q J Exp Psychol (Hove). Oct. 2016; 69(10): 1996-2019. doi: 10.1080/17470218.2014.990392. Epub Jan. 27, 2015. PMID: 25427883. (Year: 2016).*

(Continued)

*Primary Examiner* — Claire X Wang
*Assistant Examiner* — Stephen M Brinich
(74) *Attorney, Agent, or Firm* — Birch, Stewart, Kolasch & Birch, LLP (57) ABSTRACT

A face depth image is normalized and color-transferred into a normalized face depth image. The face color image and the normalized face depth image are mixed into a face mixed image. A plurality of face mixed images of several different users are processed with face landmark alignment and mean, and then are synthesized with the face mixed image of another user into an imaginary face.

12 Claims, 7 Drawing Sheets

(52) U.S. Cl.
CPC ...... *G06T 7/90* (2017.01); *G06T 2207/20221* (2013.01); *G06T 2207/30201* (2013.01)

(58) Field of Classification Search
CPC . G06T 2207/20216; G06T 2207/20212; G06T 2207/30201; G06T 2207/30196
USPC .......................... 382/100, 115–118, 155–159
See application file for complete search history.

(56) References Cited

U.S. PATENT DOCUMENTS

| | | | |
|---|---|---|---|
| 7,492,943 B2 | 2/2009 | Li et al. | |
| 9,053,392 B2 | 6/2015 | Yang et al. | |
| 10,133,988 B2 | 11/2018 | Ribeiro Mendes Júnior et al. | |
| 10,303,948 B2* | 5/2019 | Tan | G06K 9/6215 |
| 2003/0063778 A1* | 4/2003 | Rowe | G06K 9/00221 382/115 |
| 2010/0209000 A1* | 8/2010 | Usui | G06K 9/00281 382/195 |
| 2011/0050939 A1* | 3/2011 | Tsurumi | G06K 9/00228 348/222.1 |
| 2015/0242678 A1* | 8/2015 | Lee | G06K 9/00302 382/118 |
| 2018/0121713 A1 | 5/2018 | Guo et al. | |
| 2018/0174600 A1* | 6/2018 | Chaudhuri | H04N 21/4666 |
| 2020/0160122 A1* | 5/2020 | Lints | H04L 67/42 |

FOREIGN PATENT DOCUMENTS

| | | | |
|---|---|---|---|
| CN | 109948467 A | * | 6/2019 |
| TW | 200719871 A | | 6/2007 |
| TW | I382354 B1 | | 11/2017 |

OTHER PUBLICATIONS

Taiwanese Office Action and Search Report for Taiwanese Application No. 108139713, dated Oct. 7, 2020.
Huang et al., "Pose invariant Face Recognition", Publication Unknown, Date Unknown, 6 pages.
Li et al., "Open Set Face Recognition Using Transduction" IEEE Transactions On Pattern Analysis And Machine Intelligence, vol. 27, No. 11, Nov. 2005, pp. 1686-1697 (12 pages).
Mendes Júnior et al., "Nearest Neighbors Distance Ratio Open-Set Classifier", Mach Learn, vol. 106, 2017, pp. 359-386 ( 28 pages).

* cited by examiner

FIG. 7A (Embodiment)

FIG. 7B (Comparison example)

IMAGINARY FACE GENERATION METHOD AND SYSTEM, AND FACE RECOGNITION METHOD AND SYSTEM USING THE SAME

This application claims the benefit of Taiwan application Serial No. 108139713, filed Nov. 1, 2019, the subject matter of which is incorporated herein by reference.

TECHNICAL FIELD

The disclosure relates in general to an imaginary face generation method and system, and a face recognition method using the same.

BACKGROUND

Along with the development of the face recognition technology, it has become a trend to recognize human faces using artificial intelligence (AI) deep learning. However, the accuracy of deep learning depends on the diversity of the training data. The larger the number of the face images used as the training data of the deep learning model, the higher the accuracy and the efficiency in face recognition. When the number of training data is not large enough, the increase in facial diversity will help to increase the efficiency in face recognition.

A high-risk factory requires strict personnel control. To comply with the work safety regulations, any person must wear a helmet and a goggle when entering the high-risk factory. Under such circumstance, the face recognition system introduced to the high-risk factory will have poor efficiency in face recognition.

Furthermore, the face recognition system is sensitive to the ambient light source, which will affect the face recognition rate.

Therefore, it has become a prominent task for the industry to provide an imaginary face generation method and system, and a face recognition method using the same capable of increasing facial diversity to resolve the above and other problems of the face recognition system.

SUMMARY

According to one embodiment, an imaginary face generation method is provided. The method includes: for each of a plurality of original face image stored in a storage device, obtaining a face color image and a face depth image frame by frame, performing face region detection to the face color image to locate a face region of the face color image, normalizing and color-transferring a face region of the face depth image into a normalized face depth image according to the face region of the face color image, and superimposing the face color image and the normalized face depth image to generate a face mixed image; performing face region detection and face landmark alignment to the face mixed images; calculating the mean of the face mixed images having been processed with face landmark alignment to obtain a first virtual face mixed image; and superimposing a first face mixed image and the first virtual face mixed image into an imaginary face, wherein the first face mixed image does not belong to the face mixed images.

According to another embodiment, an imaginary face generation system is provided. The system includes an image mixing module and an image synthesizing module. The image mixing module is configured to: for each of a plurality of original face image stored in a storage device, obtain a face color image and a face depth image frame by frame; perform face region detection to the face color image to locate a face region of the face color image; normalize and color-transfer a face region of the face depth image into a normalized face depth image according to the face region of the face color image; and superimpose the face color image and the normalized face depth image to generate a face mixed image. The image synthesizing module is configured to: perform face region detection and face landmark alignment to the face mixed images; take the mean of the face mixed images having been processed with face landmark alignment to obtain a first virtual face mixed image; and superimpose a first face mixed image and the first virtual face mixed image into an imaginary face, wherein the first face mixed image does not belong to the face mixed images.

According to an alternative embodiment, a face recognition method is provided. The method includes: for each of a plurality of original face image stored in a storage device, obtaining a face color image and a face depth image frame by frame, performing face region detection to locate a face region of the face color image to the face color image, normalizing and color-transferring a face region of the face depth image into a normalized face depth image according to the face region of the face color image, and superimposing the normalized face depth image to generate a face mixed image; performing face region detection and face landmark alignment to the face mixed images; calculating the mean of the face mixed images having been processed with face landmark alignment to obtain a first virtual face mixed image; superimpose a first face mixed image and the first virtual face mixed image into an imaginary face, wherein the first face mixed image does not belong to the face mixed images; and using the imaginary face in a training stage of a face recognition.

According to another alternative embodiment, a face recognition system is provided. The system includes: an imaginary face generation system and a recognition module. The imaginary face generation system includes an image mixing module and an image synthesizing module. The image mixing module is configured to: for each of a plurality of original face image stored in a storage device, obtain a face color image and a face depth image frame by frame; perform face region detection to the face color image to locate a face region of the face color image; normalize and color-transfer a face region of the face depth image into a normalized face depth image according to the face region of the face color image; and superimpose the face color image and the normalized face depth image to generate a face mixed image. The image synthesizing module is configured to: perform face region detection and face landmark alignment to the face mixed images; take the mean of the face mixed images having been processed with face landmark alignment to obtain a first virtual face mixed image; and superimpose a first face mixed image and the first virtual face mixed image into an imaginary face, wherein the first face mixed image does not belong to the face mixed images. The imaginary face is used in a training stage of the recognition module.

The above and other aspects of the invention will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art could selectively implement or combine some or all of the technical features of any embodiment of the present disclosure.

Figure 1:
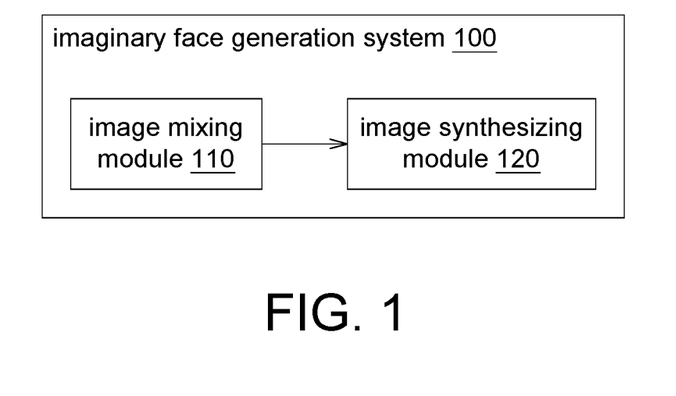
FIG. 1 is a functional block diagram of an imaginary face generation system according to an embodiment of the disclosure.

Referring to FIG. 1, a functional block diagram of an imaginary face generation system according to an embodiment of the disclosure is shown. The imaginary face generation system according to an embodiment of the disclosure could be used in the face recognition system. Details of the face recognition system are disclosed below.

As indicated in FIG. 1, the imaginary face generation system 100 according to an embodiment of the disclosure includes an image mixing module 110 and an image synthesizing module 120. The image mixing module 110 and the image synthesizing module 120 could be realized by such as software, software or firmware, and are still within the spirit of the disclosure.

The image mixing module 110 is configured to mix the face color image and the face depth image into a face mixed image. The image synthesizing module 120 is configured to synthesize the face mixed images of several different users into an imaginary face. Detailed descriptions of the image mixing module 110 and the image synthesizing module 120 are disclosed below.

Figure 2:
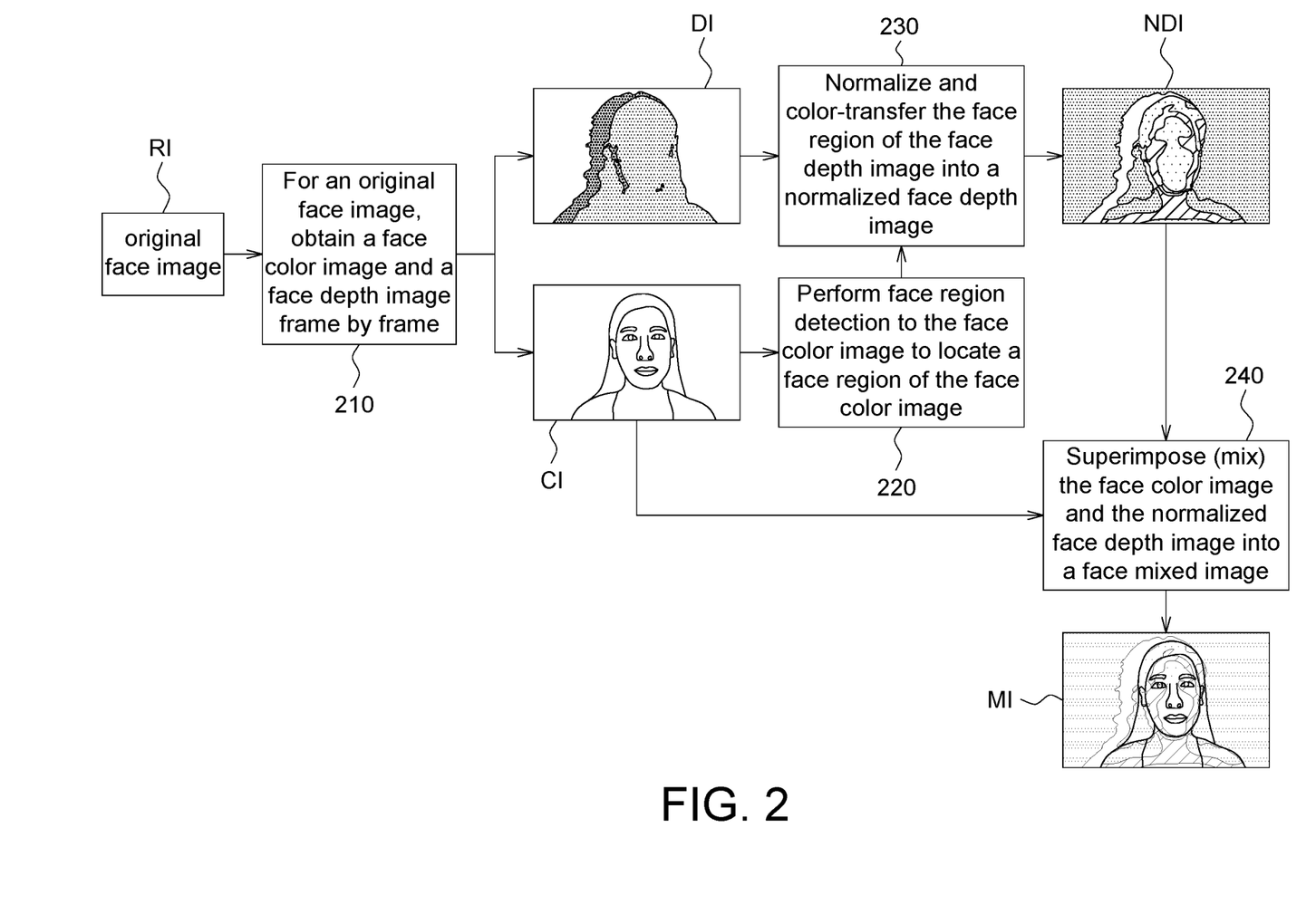
FIG. 2 is a schematic diagram of image mixing according to an embodiment of the disclosure.

Referring to FIG. 2, a schematic diagram of image mixing according to an embodiment of the disclosure is shown. FIG. 2 illustrates the operations of the image mixing module 110. As indicated in FIG. 2, for an original face image RI, a face color image CI and a face depth image DI are obtained frame by frame (step 210), that is, the face color image CI and the face depth image DI form a one-to-one relation. In an embodiment of the disclosure, the original face image RI could be obtained by photographing a user by using an image sensor capable of capturing a color image (such as a 2D color image or a 3D color image) and a depth information simultaneously, and the original face image RI is stored in a storage device such as a hard disc, an optical drive or a memory. Similarly, the face color image CI and the face depth image DI obtained in step 210 could also be stored in the storage device.

Face region detection is performed to the face color image CI (step 220) to locate a face region of the face color image CI.

Based on the face region located in step 220, the face region of the face depth image DI is normalized and color-transferred into a normalized face depth image NDI (step 230). Details of the normalization process are not subjected to specific restrictions here. The face depth image DI could be a grayscale image. In the grayscale image, the grayscale value of the pixel is exemplified by 0~255, but the disclosure is not limited thereto. The normalized face depth image NDI obtained in step 230 could also be stored in the storage device.

During the color-transferring process, like the color bar concept, the grayscale value of 255 could be transferred to red, the middle grayscale values could be transferred to yellow, green or blue, and the grayscale value of 0 could be transferred to dark blue. In an embodiment of the disclosure, after the color-transferring process is performed, the face region of the normalized face depth image NDI is chromatic, but the non-face region of the normalized face depth image NDI is still grayscale.

In an embodiment of the disclosure, the technology of normalizing and color-transferring the face region of the face depth image DI advantageously makes the depth information of the normalized face depth image NDI even more significant. Thus, after the normalizing and color-transferring process is performed, the difference between the face region and the non-face region of the normalized face depth image NDI will become more significant.

Then, the face color image CI and the normalized face depth image NDI are superimposed into a face mixed image MI (step 240). The face mixed image MI obtained in step 240 could also be stored in a storage device.

An example of image superimposing according to an embodiment of the disclosure is disclosed below, but the disclosure is not limited thereto.

The face color image CI could be an RGB image, a YCbCr image, or a CMYK image, and the disclosure is not limited thereto.

During the image superimposing (mixing) process, images are superimposed in the unit of pixels. The relation between the face mixed image MI and the face color image CI and the normalized face depth image NDI could be expressed as:

$$\text{Image}_{mix} = \alpha \times \text{Image}_{color} + (1-\alpha) \times \text{Image}_{depth} \quad (1)$$

In formula 1, represents the pixel value of the face mixed image MI; represents the pixel value of the face color image CI;

represents the pixel value of the normalized face depth image NDI; and $\alpha$ is a parameter in the range of 0~1.

To be more specifically, the face color image CI is exemplified by an RGB image, and the pixel value of the pixel of the face mixed image MI could be expressed as:

$$\begin{cases} R^{mix}_{(i,j)} = \alpha \times R^{color}_{(i,j)} + (1-\alpha) \times R^{depth}_{(i,j)} \\ G^{mix}_{(i,j)} = \alpha \times G^{color}_{(i,j)} + (1-\alpha) \times G^{depth}_{(i,j)} \\ B^{mix}_{(i,j)} = \alpha \times B^{color}_{(i,j)} + (1-\alpha) \times B^{depth}_{(i,j)} \end{cases} \quad (2)$$

In formula 2, respectively represent the pixel value of the pixel of the face mixed image MI; respectively represent the pixel value of the pixel of the face color image CI; and respectively represent the pixel value of the pixel of the normalized face depth image NDI.

Figure 3:
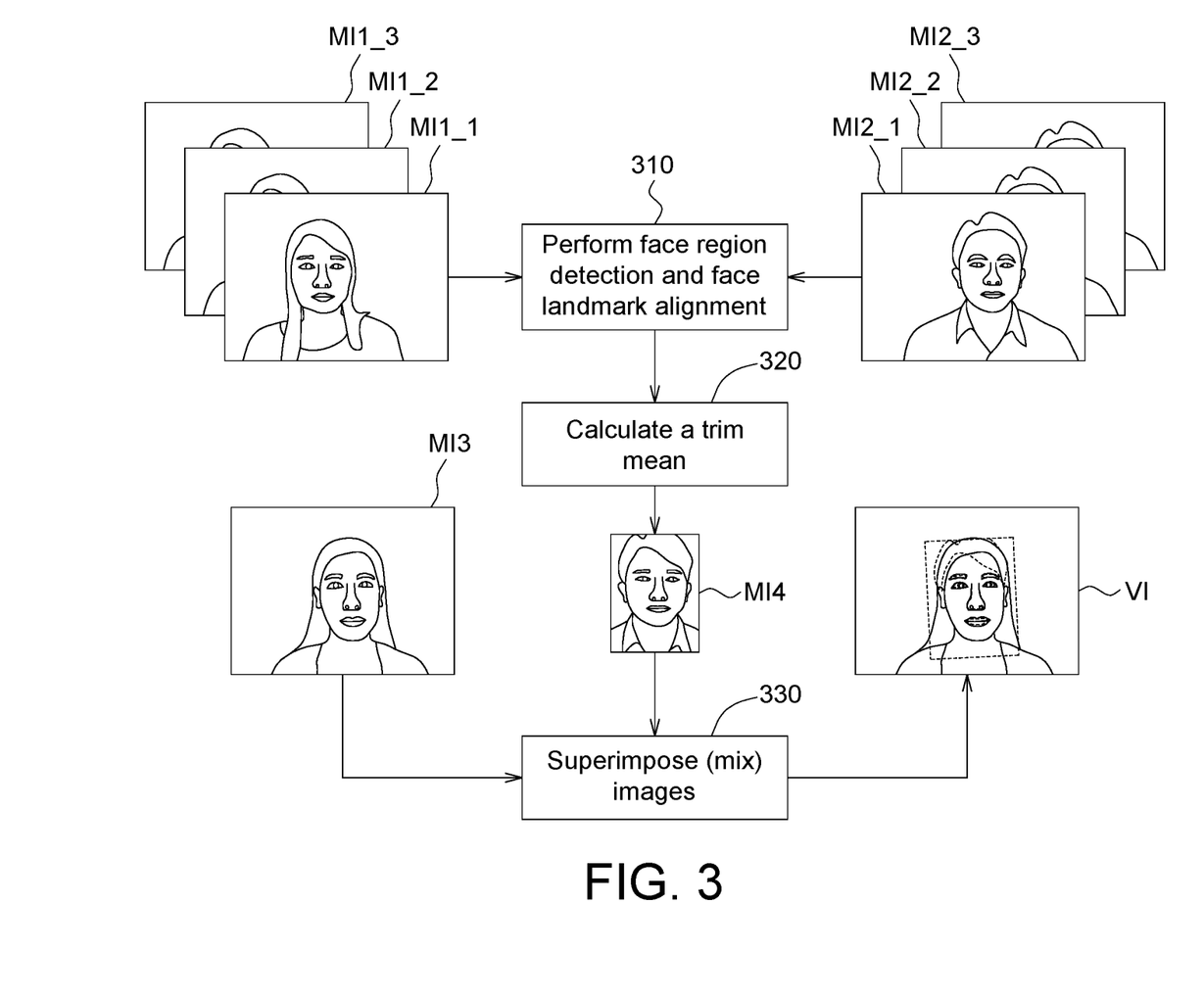
FIG. 3 is a schematic diagram of image synthesizing according to an embodiment of the disclosure.

Referring to FIG. 3, a schematic diagram of image synthesizing according to an embodiment of the disclosure is shown. FIG. 3 illustrates the operations of the image synthesizing module 120. As indicated in FIG. 3, each of the face mixed images MI1_1~MI1_3 and MI2_1~MI2_3 is a face mixed images. That is, the operations of FIG. 2 could be performed to several original face images (such as the front or the lateral face images) of a first user to obtain a plurality of face mixed images MI1_1~MI1_3. Similarly, the operations of FIG. 2 could be performed to several original face images (such as the front or the lateral face images) of a second user to obtain a plurality of face mixed images MI2_1~MI2_3. Although the number of face mixed images is exemplified by 3 in FIG. 3, the number of face mixed images used in the disclosure could be more than or less than 3. Although the process of image superimposing of FIG. 3 is exemplified by superimposing respective face mixed images of two users, the image superimposing process could also be used for superimposing the face mixed images of at least two users.

In step 310, face region detection and face landmark alignment are performed to the face mixed images. That is, face region detection is performed to the face mixed images to locate respective face regions of each of the face mixed images MI1_1~MI2_3. Then, face landmarks (such as eyes, nose, mouth) of respective face regions of each of the face mixed images MI1_1~MI2_3 are located. In an embodiment of the disclosure, 68 face landmarks are located by a facial landmark model. Then, 68 face landmarks of the face mixed images MI1_1~MI2_3 are aligned.

Then, the method proceeds to step 320, a trim mean is calculated. FIG. 3 illustrates 6 face mixed images MI1_1~MI2_3, and for each pixel at the same position (such as the pixel at the top left corner) of each face mixed image, 6 pixel values could be obtained. After the 6 pixel values are ranked and the outliers (such as the maximum pixel value and the minimum pixel value) are excluded, 4 pixel values are left. Then, the mean of the 4 remaining pixel values is calculated. After step 320 is performed, another face mixed image MI4 could be obtained. The face mixed image MI4 is a virtual face mixed image which keeps the original face landmarks of the first user and the second user as much as possible.

Then, the face mixed image MI3 of the third user (the third user is different from the first user and the second user) and the face mixed image MI4 obtained in step 320 are superimposed (mixed) into an imaginary face VI (step 330). That is, the face mixed image MI3 does not belong to the face mixed images MI1_1~MI2_3. The superimposing (mixing) details in step 330 could be obtained with reference to the step 240 of FIG. 2, and are not repeated here. Similarly, the face mixed image MI3 of the third user could be obtained according to the operations illustrated in FIG. 2. When superimposing the face mixed images MI3 and MI4, if necessary, the face landmarks could be fine-tuned or aligned. For example, during the superimposing process, if the eye distance is narrower in the face mixed image MI4 (a virtual face) but is wider in the face mixed image MI3 (a real face), then the eye distance in the face mixed image MI4 could be adjusted to comply with that in the face mixed image MI3 (a real face).

In an embodiment of the disclosure, the imaginary face VI is still a virtual face, but is close to the faces of the first user (the face mixed image MI1_1~MI1_3) and the second user (MI2_1~MI2_3). Although the imaginary face VI is close to the real face (such as the first user and the second user), it is not the real face. Therefore, the imaginary face VI is useful for the training of face recognition.

Figure 4:
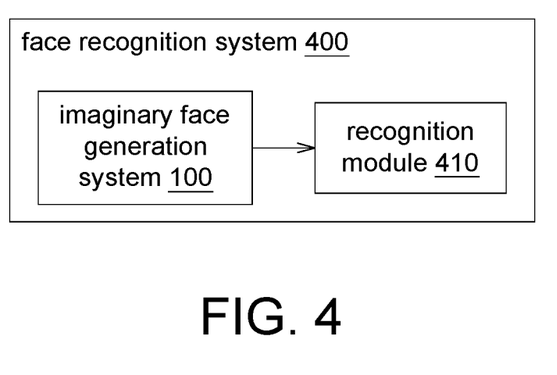
FIG. 4 is a functional block diagram of a face recognition system according to an embodiment of the disclosure.

Referring to FIG. 4, a functional block diagram of a face recognition system according to an embodiment of the disclosure is shown. As indicated in FIG. 4, the face recognition system 400 according to an embodiment of the disclosure includes an imaginary face generation system 100 and a recognition module 410. That is, the imaginary face generation system 100 according to an embodiment of the disclosure is configured to generate a plurality of imaginary faces (the imaginary face VI as indicated in FIG. 3), but the imaginary faces could be used as the training data of the recognition module 41 to increase the recognition efficiency of the recognition module 410. The imaginary faces could be stored in the storage device, and then could be read by the recognition module 410 for the training purpose.

Figure 5:
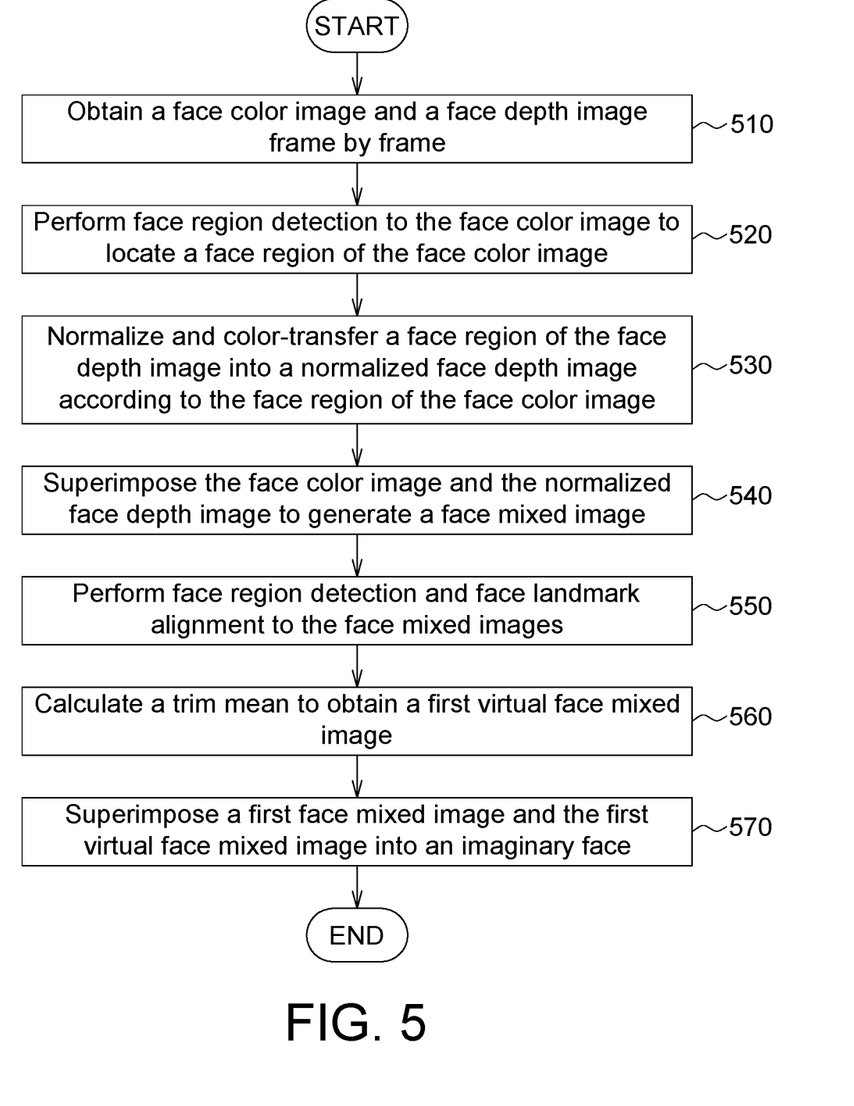
FIG. 5 is a flowchart of an imaginary face generation method according to an embodiment of the disclosure.

FIG. 5 is a flowchart of an imaginary face generation method according to an embodiment of the disclosure. For each of a plurality of original face image stored in a storage device, a face color image and a face depth image are obtained frame by frame (510); face region detection is performed to the face color image to locate a face region of the face color image (520); a face region of the face depth image is normalized and color-transferred into a normalized face depth image according to the face region of the face color image (530); the face color image and the normalized face depth image are superimposed to generate a face mixed image (540); face region detection and face landmark alignment are performed to the face mixed images (550); a trim mean of the face mixed images having been processed with face landmark alignment is calculated to obtain a first virtual face mixed image (560); and a first face mixed image and the first virtual face mixed image are superimposed into an imaginary face, wherein the first face mixed image does not belong to the face mixed images (570).

Figure 6:
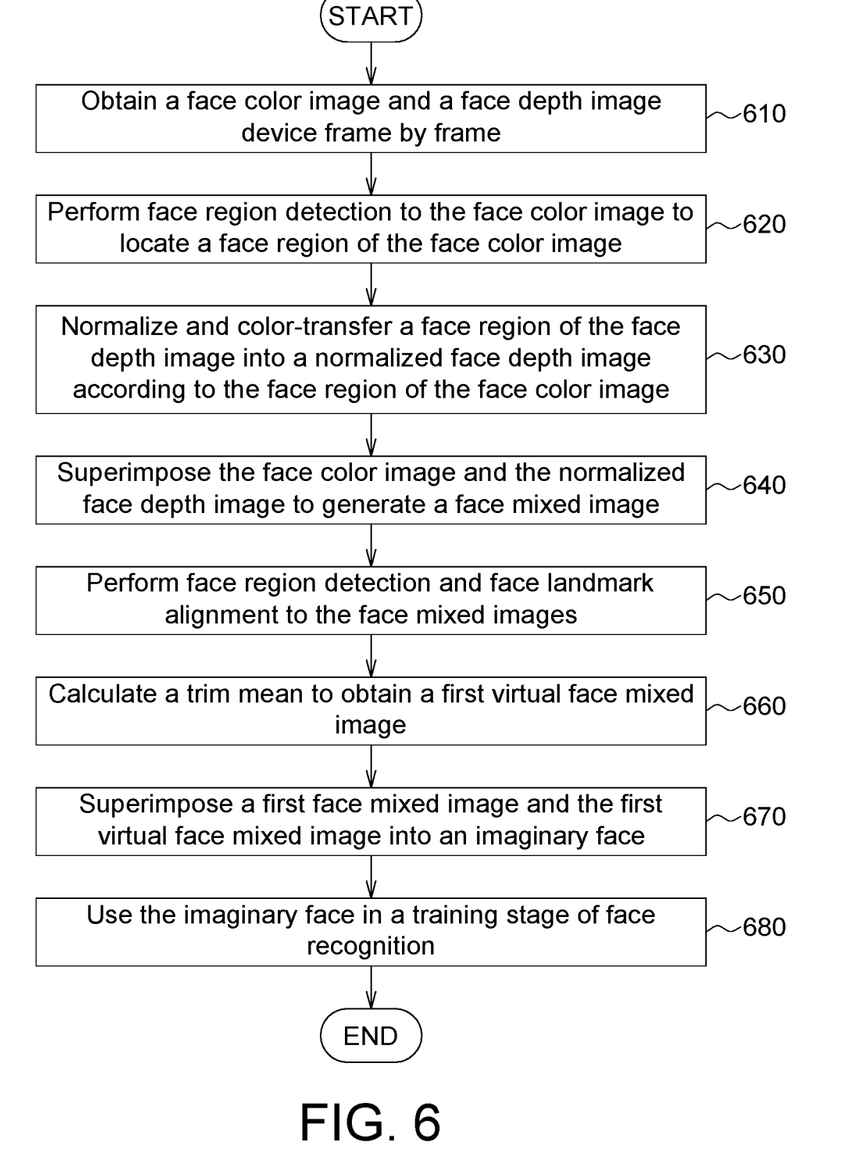
FIG. 6 is a flowchart of using imaginary face in the training in face recognition according to an embodiment of the disclosure.

FIG. 6 is a flowchart of using imaginary face in the training in face recognition according to an embodiment of the disclosure. For each of a plurality of original face image stored in a storage device, a face color image and a face depth image is obtained frame by frame (610); face region detection is performed to the face color image to locate a face region of the face color image (620); a face region of the face depth image is normalized and color-transferred into a normalized face depth image according to the face region of the face color image (630); the face color image and the normalized face depth image are superimposed to generate a face mixed image (640); face region detection and face landmark alignment are performed to the face mixed images (650); a trim mean of the face mixed images having been processed with face landmark alignment is calculated to obtain a first virtual face mixed image (660); a first face mixed image and the first virtual face mixed image are superimposed into an imaginary face, wherein the first face mixed image does not belong to the face mixed images (670); and the imaginary face is used in a training stage of face recognition (680).

Figure 7A:
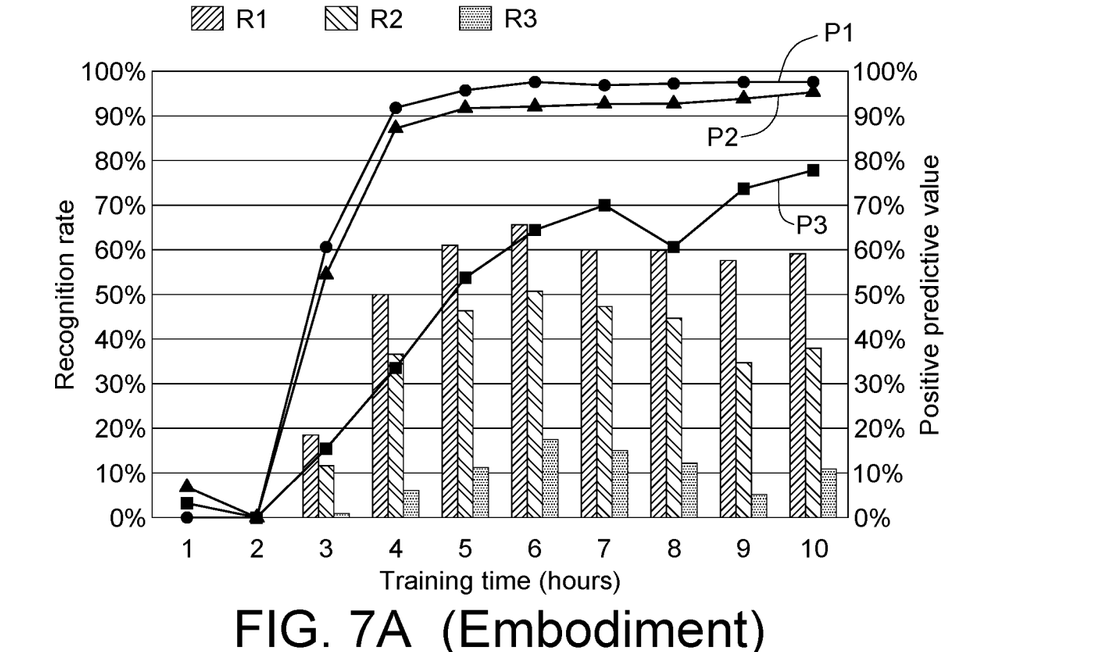
FIG. 7A is a chart of efficiency in face recognition according to an embodiment of the disclosure.
Figure 7B:
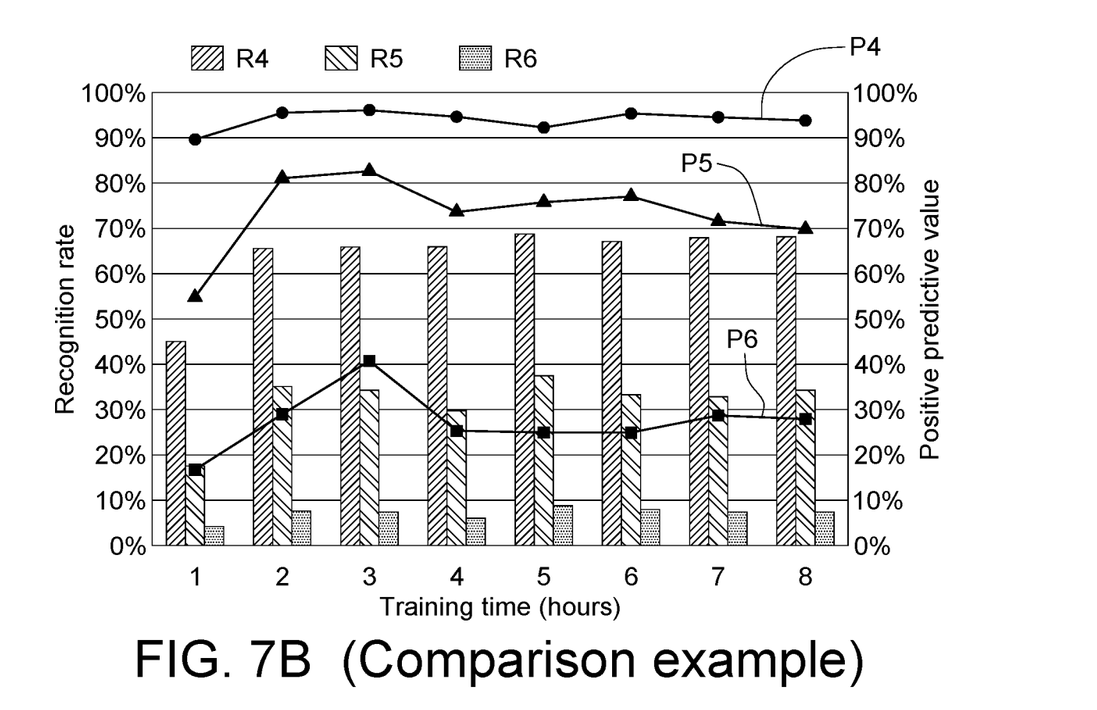
FIG. 7B is a chart of efficiency in face recognition according to a comparison example.

FIG. 7A is a chart of efficiency in face recognition according to an embodiment of the disclosure. FIG. 7B is a chart of efficiency in face recognition according to a comparison example. R1, R2 and R3 respectively represent the recognition rates according to an embodiment of the disclosure under the normal circumstance (the user does not wear the goggle or the helmet), the circumstance that the user wears the goggle only, and the circumstance that the user wears both the goggle and the helmet. R4, R5 and R6 respectively represent the recognition rate of a comparison example under the normal circumstance (the user does not wear the goggle or the helmet), the circumstance that the user wears the goggle only, and the circumstance that the user wears both the goggle and the helmet. P1, P2 and P3 respectively represent the positive predictive value according to an embodiment of the disclosure under the normal circumstance (the user does not wear the goggle or the helmet), the circumstance that the user wears the goggle only, and the circumstance that the user wears both the goggle and the helmet. P4, P5 and P6 respectively represent respectively represent the positive predictive value of a comparison example under the normal circumstance (the user does not wear the goggle or the helmet), the circumstance that the user wears the goggle only, and the circumstance that the user wears both the goggle and the helmet. The comparison of recognition rates and positive predictive values between the embodiment of the disclosure and the comparison example shows that that the embodiment of the disclosure is indeed superior to the comparison example.

The imaginary face generated according to an embodiment of the disclosure could be used in the training stage of face recognition together with several original face images of the first user and the second user. Thus, the increase in facial diversity is beneficial to the training/learning of face recognition. In an embodiment of the disclosure, the training/learning of face recognition includes machine learning models such as deep convolutional neural network (CNN), feedforward neural network (FNN), auto-encoder, and support vector machine (SVM).

In an embodiment of the disclosure, an imaginary face could be generated according to image mixing and image synthesizing and could benefit the training of face recognition.

The embodiment of the disclosure could be used in a fast face recognition clearance mechanism. When a user is going through the custom clearance process, he or she does not need to take off his or her helmet or goggle, and therefore avoids breaching public security.

The embodiment of the disclosure could be used in a reliable and fast authentication system to avoid the efficiency in face recognition being interfered with by an ambient light source. The embodiment of the disclosure could be used around the clock (that is, the efficiency in face recognition will not be affected regardless of the light source being sufficient or not). Even when the user wears a helmet and/or a goggle, the recognition efficiency of the embodiment of the disclosure is significantly increased.

In an embodiment of the disclosure, a large volume of imaginary faces could be synthesized from the original face images of only a few users and could be used in the training of face recognition to increase the accuracy in face recognition.

To summarize, the embodiment of the disclosure could generate a large volume of imaginary faces through simulation/estimation using existing face images. Thus, the existing face images could be used to generate more training data to increase the efficiency in deep learning.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An imaginary face generation method, comprising:
generating a plurality of face mixed images from a plurality of original face images stored in a storage device, said plurality of face mixed images being generated by:
processing each of the plurality of original face images, comprising:
obtaining a face color image and a face depth image frame by frame;
performing face region detection to the face color image to locate a face region of the face color image;
normalizing and color-transferring a face region of the face depth image into a normalized face depth image according to the face region of the face color image; and
superimposing the face color image and the normalized face depth image to generate one of the plurality of face mixed images,
wherein the plurality of face mixed images includes a first face mixed image;
performing face region detection and face landmark alignment to the plurality of face mixed images excluding the first face mixed image;
calculating mean of the plurality of face mixed images excluding the first face mixed image that have been processed with face landmark alignment to obtain a first virtual face mixed image; and
superimposing the first face mixed image and the first virtual face mixed image into an imaginary face.

2. The imaginary face generation method according to claim 1, wherein after the color-transferring process is performed, the face region of the normalized face depth image is chromatic, and a non-face region of the normalized face depth image is grayscale.

3. The imaginary face generation method according to claim 1, wherein during the process of face region detection and face landmark alignment performed to the face mixed images, the method comprises:
performing face region detection to the face mixed images to locate respective face regions of each of the face mixed images;
locating a plurality of respective face landmarks from the respective face regions of each of the face mixed images; and
aligning the respective face landmarks of the face mixed images.

4. The imaginary face generation method according to claim 1, wherein the method comprises: excluding at least one outlier when calculating the mean of the face mixed images.

5. The imaginary face generation method according to claim 1, wherein the face mixed images are obtained by photographing a first user and a second user, and the first face mixed image is obtained by photographing a third user who is different from the first user and the second user.

6. An imaginary face generation system, comprising:
an image mixing module and an image synthesizing module,
wherein
the image mixing module is configured to: generate a plurality of face mixed images from a plurality of original face images stored in a storage device, said plurality of face mixed images being generated by:

processing each of the plurality of original face images, comprising:
  obtaining a face color image and a face depth image frame by frame;
  performing face region detection to the face color image to locate a face region of the face color image;
  normalizing and color-transferring a face region of the face depth image into a normalized face depth image according to the face region of the face color image; and
  superimposing the face color image and the normalized face depth image to generate one of the plurality of face mixed images,
  wherein the plurality of face mixed images includes a first face mixed image;
the image synthesizing module is configured to:
perform face region detection and face landmark alignment to the plurality of face mixed images excluding the first face mixed image;
take mean of the plurality of face mixed images excluding the first face mixed image that have been processed with face landmark alignment to obtain a first virtual face mixed image; and
superimpose the first face mixed image and the first virtual face mixed image into an imaginary face.

7. The imaginary face generation system according to claim 6, wherein after the color-transferring process is performed, the face region of the normalized face depth image is chromatic, and a non-face region of the normalized face depth image is grayscale.

8. The imaginary face generation system according to claim 6, wherein during the process of face region detection and face landmark alignment performed to the face mixed images, the image synthesizing module is configured to:
  perform face region detection to the face mixed images to locate respective face regions of each of the face mixed images;
  locate a plurality of respective face landmarks from the respective face regions of each of the face mixed images; and
  align the respective face landmarks of the face mixed images.

9. The imaginary face generation system according to claim 6, wherein the image synthesizing module is configured to: exclude at least one outlier when calculating the mean of the face mixed images.

10. The imaginary face generation system according to claim 6, wherein the face mixed images are obtained by photographing a first user and a second user, and the first face mixed image is obtained by photographing a third user who is different from the first user and the second user.

11. A face recognition method, comprising:
  generating a plurality of face mixed images from a plurality of original face images stored in a storage device, said plurality of face mixed images being generated by:
  processing each of the plurality of original face images, comprising:
    obtaining a face color image and a face depth image frame by frame;
    performing face region detection to the face color image to locate a face region of the face color image;
    normalizing and color-transferring a face region of the face depth image into a normalized face depth image according to the face region of the face color image; and
    superimposing the face color image and the normalized face depth image to generate one of the plurality of face mixed images,
    wherein the plurality of face mixed images includes a first face mixed image;
  performing face region detection and face landmark alignment to the plurality of face mixed images excluding the first face mixed image;
  calculating mean of the plurality of face mixed images excluding the first face mixed image that have been processed with face landmark alignment to obtain a first virtual face mixed image;
  superimposing the first face mixed image and the first virtual face mixed image into an imaginary face; and
  using the imaginary face in a training stage of a face recognition.

12. A face recognition system, comprising:
an imaginary face generation system and a recognition module,
wherein
the imaginary face generation system comprises an image mixing module and an image synthesizing module,
the image mixing module is configured to: generate a plurality of face mixed images from a plurality of original face images stored in a storage device, said plurality of face mixed images being generated by:
processing each of the plurality of original face images, comprising:
  obtaining a face color image and a face depth image frame by frame;
  performing face region detection to the face color image to locate a face region of the face color image;
  normalizing and color-transferring a face region of the face depth image into a normalized face depth image according to the face region of the face color image; and
  superimposing the face color image and the normalized face depth image to generate one of the plurality of face mixed images,
  wherein the plurality of face mixed images includes a first face mixed image;
the image synthesizing module is configured to:
perform face region detection and face landmark alignment to the plurality of face mixed images excluding the first face mixed image;
take mean of the plurality of face mixed images excluding the first face mixed image that have been processed with face landmark alignment to obtain a first virtual face mixed image; and
superimpose the first face mixed image and the first virtual face mixed image into an imaginary face,
use the imaginary face in a training stage of the recognition module.

* * * * *